(12) United States Patent
Jarrett et al.

(10) Patent No.: US 7,654,240 B2
(45) Date of Patent: Feb. 2, 2010

(54) ENGINE PISTON HAVING AN INSULATING AIR GAP

(75) Inventors: Mark Wayne Jarrett, Washington, IL (US); Brent Michael Hunold, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 26 days.

(21) Appl. No.: 11/505,803

(22) Filed: Aug. 18, 2006

(65) Prior Publication Data
US 2008/0041333 A1   Feb. 21, 2008

(51) Int. Cl.
   *F02F 3/00*   (2006.01)
(52) U.S. Cl. .................................................. 123/193.6
(58) Field of Classification Search .............. 123/193.6, 123/41.35, 41.45–41.7
   See application file for complete search history.

(56) References Cited

U.S. PATENT DOCUMENTS

| | | | |
|---|---|---|---|
| 1,501,387 A | 7/1924 | Zenke | |
| 2,159,402 A | 5/1939 | Retschy | |
| 3,516,335 A | 6/1970 | Fangman | |
| 3,628,511 A * | 12/1971 | Fischer | 123/41.35 |
| 4,018,194 A * | 4/1977 | Mitchell et al. | 123/276 |
| 4,253,430 A | 3/1981 | Garter et al. | |
| 4,270,494 A | 6/1981 | Garter et al. | |
| 4,494,501 A | 1/1985 | Ludovico | |
| 4,553,472 A * | 11/1985 | Munro et al. | 92/176 |
| 4,593,608 A | 6/1986 | Corey et al. | |
| 4,604,945 A | 8/1986 | Mizuhara | |
| 4,712,600 A | 12/1987 | Hamajima et al. | |
| 4,848,291 A * | 7/1989 | Kawamura et al. | 123/193.6 |
| 5,081,968 A * | 1/1992 | Bruni | 123/193.6 |
| 5,282,411 A | 2/1994 | Hirai et al. | |
| 5,309,818 A | 5/1994 | Mendes et al. | |
| 5,645,028 A | 7/1997 | Matsuoka et al. | |
| 5,724,933 A * | 3/1998 | Silvonen et al. | 123/193.6 |
| 5,975,040 A * | 11/1999 | Silvonen et al. | 123/193.6 |
| 6,112,642 A | 9/2000 | Jarrett et al. | |
| 6,155,157 A | 12/2000 | Jarrett | |
| 6,260,472 B1 | 7/2001 | Zhu et al. | |
| 6,662,709 B1 | 12/2003 | Beutler | |
| 6,825,450 B2 | 11/2004 | Ribeiro et al. | |
| 2004/0129243 A1* | 7/2004 | Robelet | 123/193.6 |

FOREIGN PATENT DOCUMENTS

| | | |
|---|---|---|
| DE | 3110292 | 9/1982 |
| EP | 0731268 | 9/1996 |

* cited by examiner

*Primary Examiner*—M. McMahon
(74) *Attorney, Agent, or Firm*—Finnegan, Henderson, Farabow, Garrett & Dunner

(57) ABSTRACT

A piston for an internal combustion engine has an upper crown with a top and a bottom surface, and a lower crown with a top and a bottom surface. The upper crown and the lower crown are fixedly attached to each other using welds, with the bottom surface of the upper crown and the top surface of the lower crown forming a mating surface. The piston also has at least one centrally located air gap formed on the mating surface. The air gap is sealed to prevent substantial airflow into or out of the air gap.

20 Claims, 3 Drawing Sheets

ENGINE PISTON HAVING AN INSULATING AIR GAP

U.S. GOVERNMENT RIGHTS

This invention was made with government support under the terms of Contract No. DE-FC05-00OR22806 awarded by the Department of Energy. The government may have certain rights in this invention.

TECHNICAL FIELD

The present disclosure relates generally to a piston for an engine and, more particularly, to an engine piston having an insulating air gap.

BACKGROUND

Internal combustion engines, including diesel engines, gasoline engines, natural gas engines, and other engines known in the art, operate by converting heat energy of fuels to kinetic energy. In an internal combustion engine, burning of a fuel occurs in a confined space called a combustion chamber. This burning of fuel creates gases of high temperature and pressure, which expand to cause movement, for example by acting on one or more pistons. To increase efficiency of these engines it is useful to convert as much of the heat of combustion to useful work as possible, by reducing the amount of heat conducted away by the piston. Reducing heat transfer losses by way of the piston can contribute significantly to improving the operating efficiency of an internal combustion engine.

Decreasing the weight of a piston decreases its heat carrying capacity and also improves its dynamic characteristics. The weight of the piston in an internal combustion engine is typically reduced by making the piston out of a low density material such as aluminum alloys and/or steel with decreased wall thickness. While the heat of combustion is necessary to generate power, it can also damage the piston. To keep the heat from damaging the piston, the piston is often actively cooled, for example by circulating coolant through the piston and/or by splashing oil on the underside of the piston. Cooling the piston, however, increases heat extraction from the combustion chamber through the piston. Therefore, an effective mechanism for reducing the heat conducted through the piston and the heat retained by the piston, while providing for adequate cooling is required.

One method of reducing heat loss from the combustion chamber through the piston is described in U.S. Pat. No. 4,270,494 (the '494 patent), issued to Garner et al. on Jun. 2, 1981. The '494 patent describes a cross-head type piston for an internal combustion engine, which provides an insert forming a combustion bowl on the piston crown. The insert defines a central "non oil-cooled chamber" under the combustion bowl, and annular insulating air gaps under the side walls of the combustion bowl to control heat loss to circulating cooling oil. The central chamber contacts a significant portion of the combustion bowl insert and is vented to the bottom of the piston. The central chamber provides some cooling for the insert through a breathing action set up by expansion and contraction of gases within the cavity. The air gap controls heat flow primarily between the combustion gas exposed side wall of the insert and the wall of the main piston, which is exposed to a cooling oil cavity. The insert is press fitted into a recess in a main piston body and is locked in place by retaining rings. The retaining rings allow some relative movement between the combustion bowl insert and the piston body to account for thermal expansion. Cooling of the piston is provided by oil circulating through the cooling oil cavity and the venting of hot air from the central cavity.

Although the piston of the '494 patent may reduce heat extraction from the piston by providing an air gap on the side walls of the combustion bowl, it does not fully utilize an insulating air gap to reduce heat extraction from the combustion chamber. In particular, because the central cavity contacts a substantial portion of the insert, which forms the combustion bowl walls, heat extraction from the combustion bowl will be enhanced in this region. Since the bulk of the piston main body is passively cooled by the natural breathing action set up by expansion and contraction of gases within the central cavity, the piston of the '494 patent may be inadequately cooled. Also, attaching the insert to the piston main body using retention clips may increase the likelihood of the insert separating from the piston body due to inertia, during reciprocating motion of the piston.

The disclosed piston is directed to overcoming one or more of the problems set forth above.

SUMMARY OF THE INVENTION

In one aspect, the present disclosure is directed to a piston for an internal combustion engine. The piston has an upper crown with a top and a bottom surface, and a lower crown with a top and a bottom surface. The upper crown and the lower crown are fixedly attached to each other using welds, with the bottom surface of the upper crown and the top surface of the lower crown forming a mating surface. The piston also has at least one centrally located air gap formed on the mating surface. The air gap is sealed to prevent substantial airflow into or out of the air gap.

In another aspect, the present disclosure is directed to a piston for an internal combustion engine. The piston has an upper crown with a base and a side wall, and a lower crown with a base and a side wall. The upper crown and the lower crown of the piston are removably attached to each other with at least one threaded fastener. A central air gap is formed between the base of the upper crown and the base of the lower crown, and an annular air gap is formed between the side wall of the upper crown and a side wall of the lower crown.

The present disclosure is also directed to a piston for an internal combustion engine with an upper crown having a base, a side wall, and a bottom surface, and a lower crown also having a base, a side wall, and a top surface. The upper crown and the lower crown are rigidly attached to each other with the top surface and bottom surface forming a mating surface. A central air gap is formed between the base of the upper crown and the base of the lower crown, and an annular air gap is formed between the side wall of the upper crown and a side wall of the lower crown, with an annular protrusion substantially separating the central air gap from the annular air gap. The air gaps are sealed to prevent substantial airflow into or out of the air gaps, and the area of the air gaps exceed about 75% of the mating surface area.

DETAILED DESCRIPTION

Figure 1:
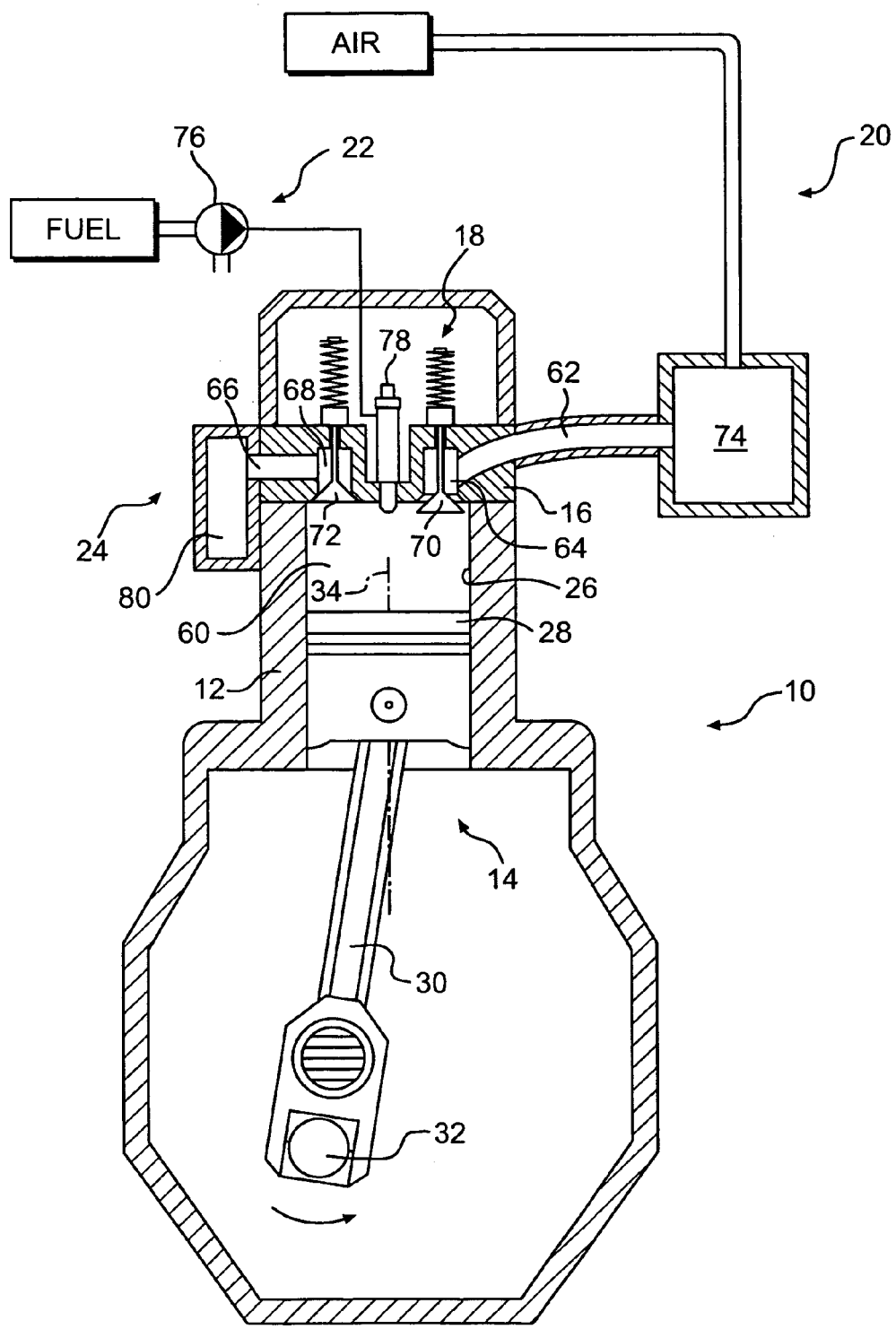
FIG. 1 is a schematic illustration of an exemplary disclosed internal combustion engine.

An exemplary internal combustion engine (engine) 10 is illustrated in FIG. 1. Engine 10 is depicted and described as a 4-stroke diesel engine. However, it is contemplated that engine 10 may be any other type of engine, such as, for example, a 2-stroke diesel engine, a gasoline engine, or natural gas engine. Engine 10 may include an engine block 12, one or more piston assemblies 14, a cylinder head 16 associated with each piston assembly 14, a valve actuation system 18, an air induction system 20, a fuel system 22, and an exhaust system 24. Although the engine 10 is depicted as having one cylinder 26, engine 10 can have any number of cylinders 26.

Engine block 12 may be a central structural member defining a plurality of cylinders 26 (only one shown). One of piston assemblies 14 may be slidably disposed within each of cylinders 26. It is contemplated that the cylinders 26 may be disposed in an "in-line" configuration, a "V" configuration, or any other conventional configuration.

Each cylinder head 16 may be associated with one cylinder 26 to form a combustion chamber 60 having one or more ports. Specifically, cylinder head 16 may define an intake passageway 62 that leads to an intake port 64 for each cylinder 26. Cylinder head 16 may further define at least one exhaust passageway 66 that leads to an exhaust port 68 for each cylinder 26. It is contemplated that one cylinder head 16 may alternatively be associated with multiple cylinders 26 and piston assemblies 14 to form multiple combustion chambers. It is also contemplated that each cylinder head 16 may further define two or more intake ports 64 and/or exhaust ports 68 for each cylinder 26.

Each piston assembly 14 may reciprocate between a bottom-dead-center (BDC) position, or lower-most position within cylinder 26, and a top-dead-center (TDC) position, or upper-most position within cylinder 26. In particular, piston assembly 14 may include a piston 28 pivotally connected to a connecting rod 30, which is in turn pivotally connected to a crankshaft 32. Crankshaft 32 of engine 10 may be rotatably disposed within engine block 12, and each piston assembly 14 coupled to crankshaft 32 so that a sliding motion of each piston assembly 14 within each cylinder 26 results in a rotation of crankshaft 32. Similarly, a rotation of crankshaft 32 may result in a sliding motion of piston assemblies 14. As crankshaft 32 rotates 180 degrees, piston 28 and linked connecting rod 30 may move through one full stroke between BDC and TDC.

Valve actuation system 18 may include an intake valve 70 disposed within each intake port 64. Each intake valve 70 may include a valve element that selectively blocks the respective intake port 64. Each intake valve 70 may be actuated to move or "lift" the valve element to thereby open the respective intake port 64. In a cylinder 26 having a pair of intake ports 64 and a pair of intake valves 70, the pair of intake valves 70 may be actuated by a single valve actuator (not shown) or by a pair of valve actuators (not shown).

An exhaust valve 72 may be disposed within each exhaust port 68. Each exhaust valve 72 may include a valve element that selectively blocks the respective exhaust port 68. Each exhaust valve 72 may be actuated to move or "lift" the valve element to thereby open the respective exhaust port 68. In a cylinder 26 having a pair of exhaust ports 68 and a pair of exhaust valves 72, the pair of exhaust valves 72 may be actuated by a single valve actuator (not shown) or by a pair of valve actuators (not shown).

Air induction system 20 may draw air into engine 10 and may include an intake manifold 74 fluidly connected with intake passageway 62. It is contemplated that air induction system 20 may be a charged air system having a turbine-driven or engine-driven compressor (not shown), or may include additional air handling components such as, for example, a waste gate, a throttle valve, an EGR system, an air cleaner, an air cooler, or any other air handling component known in the art.

Fuel system 22 may supply fuel to engine 10 and may include a source of pressurized fuel 76 and at least one fuel injector 78. It is contemplated that additional components may be included such as for example, a valve, a common fuel rail configured to distribute fuel to multiple fuel injectors, a pre-combustion chamber, or any other fuel system component known in the art.

Source of pressurized fuel 76 may produce a flow of pressurized fluid and may include a pump such as, for example, a variable displacement pump, a fixed displacement pump, a variable flow pump, or any other source of pressurized fluid known in the art. Source of pressurized fuel 76 may be drivably connected to the power source (not shown) by, for example, a countershaft (not shown), a belt (not shown), an electrical circuit (not shown), or in any other suitable manner. It is also contemplated that source of pressurized fuel 76 may alternatively be a supply of pressurized gaseous fuel.

Each of fuel injectors 78 may be disposed within cylinder head 16 associated with each cylinder 26. Each fuel injector 78 may be operable to inject an amount of pressurized fuel into combustion chamber 60 at predetermined fuel pressures and fuel flow rates. Each fuel injector 78 may be mechanically, electrically, pneumatically, or hydraulically operated.

Exhaust system 24 may direct exhaust from cylinder 26 to the atmosphere and may include an exhaust manifold 80 in fluid communication with exhaust passageway 66 associated with each cylinder 26. It is contemplated that exhaust system 24 may include other components such as, for example, a turbine, an exhaust gas recirculation system, a particulate filter, a catalytic after treatment system, or any other exhaust system component known in the art.

Figure 2A:
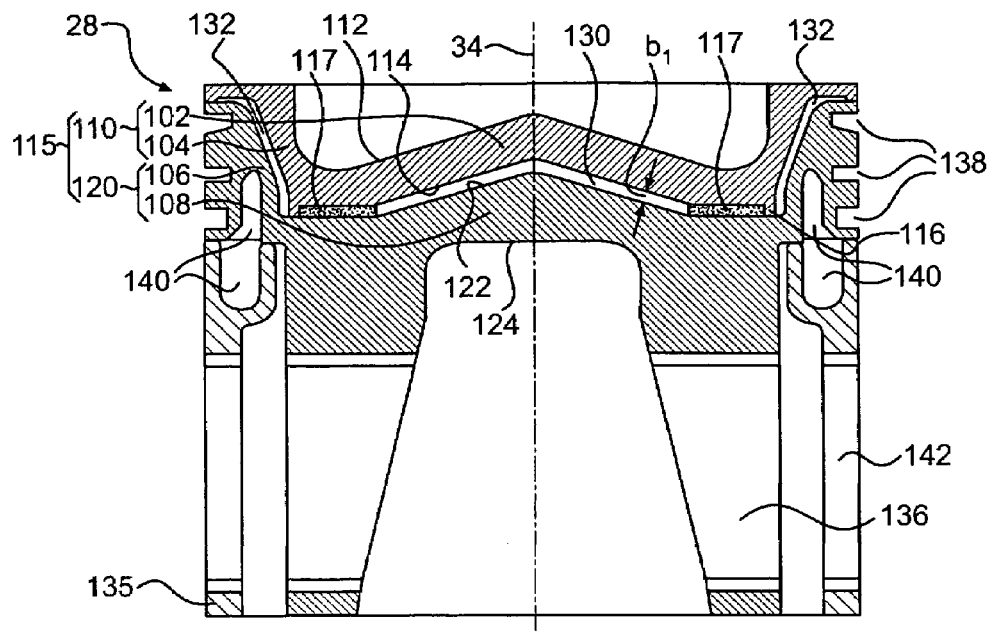
FIG. 2a is a cross-sectional illustration of an exemplary disclosed piston for use with the internal combustion engine of FIG. 1.

FIG. 2a is a cross-sectional illustration of an exemplary embodiment of piston 28. As indicated in FIG. 2a, piston 28 may have a generally cylindrical structure with a longitudinal axis 34, and include crown section 115 and skirt section 135. Crown section 115 may include an upper crown 110 and a lower crown 120 separated from each other by air gaps 130, 132 and fixedly attached to each other using welds 117. Upper crown 110 may include a base section 102 and a side wall section 104. Base and side wall sections 102, 104 of upper crown 110 together define the bottom of combustion chamber 60. Upper crown 110 may include an upper combustion surface 112 exposed to the combustion chamber 60. Combustion surface 112 may span across both base and side wall sections 102, 104 of upper crown 110, and form a general bowl shape designed to aid the mixing and combustion of fuel within combustion chamber 60. In addition, the bowl shape of combustion surface 112 may evenly distribute stress during expansion of the combustion gases in combustion chamber 60. Although combustion surface 112 is depicted as having a generally concave shape, it is contemplated that combustion surface 112 can have any shape used in the art. For example, surface 112 can have multiple concave features, convex features, and/or flat surfaces. Opposite combustion surface 112 may be located upper crown bottom surface 114. Bottom surface 114 may also span across both base and side wall sections 102, 104 of upper crown 110, and have a general bowl shape.

Lower crown 120 may also include a base section 108, side wall section 106, a top surface 122, and a bottom cooling surface 124. Top surface 122 may span across both base and side wall sections 108, 106 of lower crown 120. Top surface 122 may have the same general shape as bottom surface 114 and may generally mate with bottom surface 114. Bottom surface 114 and top surface 122 may form the mating surfaces of crown section 115.

Lower crown 120 may also have a generally cylindrical external surface with one or more ring grooves 138, a pivot bearing support 136, and a cooling passageway 140. Pivot bearing support 136 may be generally tubular, disposed transversely relative to longitudinal axis 34, and configured to receive a bearing (not shown) for rotatably supporting a wrist pin (not shown) that connects piston 28 to connecting rod 30 (see FIG. 1). Ring grooves 138 maybe annularly cut into the external cylindrical surface of lower crown 120 and configured to receive oil rings, compression rings, or any other type of piston rings known in the art. Cooling passageway 140 may be substantially annular and configured to facilitate circulation of a cooling medium such as, for example, engine oil. Cooling surface 124 may be the bottom surface of lower crown 120, and may also be cooled by the cooling medium. Alternatively, cooling surface 124 may be cooled by any other process known in the art. For example, engine oil may be splashed on cooling surface 124 during operation of the engine 10. The circulation of engine oil through cooling passageway 140 and the splashing of engine oil on cooling surface 124 during operation of engine 10 may reduce a temperature of lower crown 120.

Air gaps 130, 132 may be formed between the mating surfaces separating portions of bottom surface 114 from top surface 122. Centrally-located air gap 130 may be formed between upper crown base 102 and lower crown base 108, and a continuous annular air gap 132 may be formed between side wall 104 and side wall 106. An annular ring of weld 117 material may separate central air gap 130 from annular air gap 132. An annular lip 116 may also be formed on bottom surface 114 of upper crown 110 between base 102 and side wall 104. Alternatively or additionally, lip 116 may be formed on lower crown 120. When viewed from above, central air gap 130 may have the general shape of a circle, and annular air gap 132 may be a generally circular ring around central air gap 130. From this view, annular air gap 132 may be separated from central air gap 130 by weld 117 material, and a ring of lip 116, respectively. It is contemplated that in some applications, the weld 117 would exist on either side of the lip 116. Although FIG. 2a depicts one centrally located air gap 130 and one annular air gap 132 under the side walls of the mating surfaces, other patterns having different numbers and geometries of air gaps, welds and lips may also be possible. For example, one air gap may separate almost the entire mating surface of upper and lower crown 110, 120 with welds and lips along the outer periphery, or multiple interrupted air gap rings may be located in a pattern along the mating surface, with welds and lips at different locations. Air gaps 130, 132 may be radially symmetric with respect to longitudinal axis 34 of the piston 28 for even heat distribution, and may make up any proportion of the total mating surface area. As depicted in FIG. 2a, nearly the entire bottom surface of upper crown 114 could be separated from lower crown 122 by air gaps 130, 132. In general, the area occupied by air gaps 130, 132 may exceed about 60% of the mating surface area of upper and lower crown 110, 120. In some applications, area of air gaps 130, 132 may even exceed 80% of the mating surface area, and the ratio of air gap area to an area of physical contact between upper crown and lower crown may exceed 3. Also, although FIG. 2a shows upper and lower crowns 110, 120 as being about the same radial size, upper and lower crown 110, 120 could alternatively be different sizes.

Skirt 135 may have a generally cylindrical shape with a longitudinal axis (not shown) substantially aligned with longitudinal axis 34, and may be connected to lower crown 120. Skirt 135 may be attached to lower crown 120 by any means known in the art, or may be integrally formed with lower crown 120. Skirt 135 may also include an opening 142 for receiving the wrist pin (not shown). It is contemplated that the size and shape of skirt 135 may vary with different piston designs and may, in some cases, be eliminated altogether.

Figure 2B:
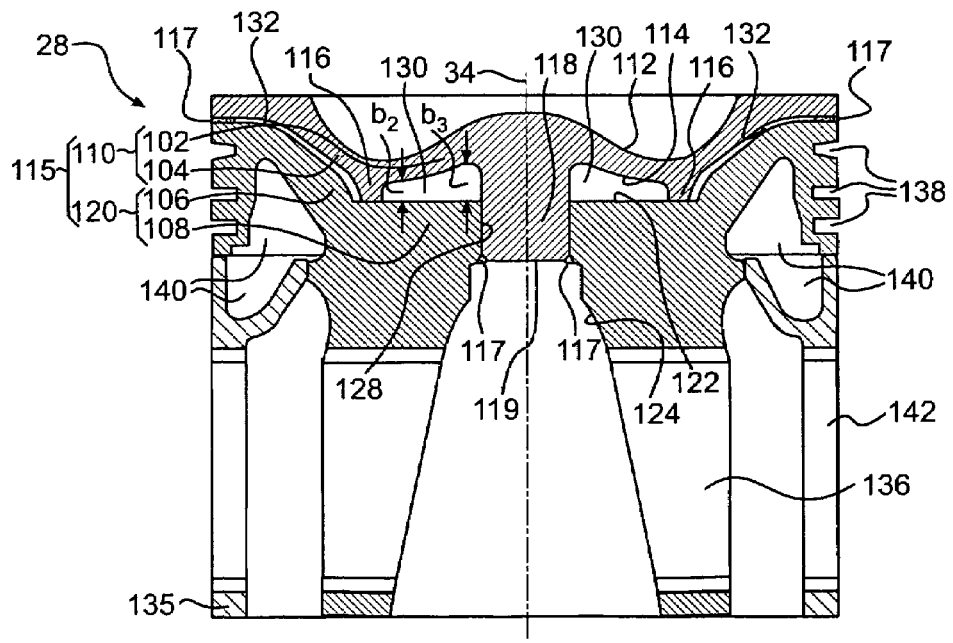
FIG. 2b is a cross-sectional illustration of another exemplary disclosed piston for use with the internal combustion engine of FIG. 1.

FIG. 2b shows a cross-sectional view of another exemplary embodiment of piston 28, where upper crown 110 and lower crown 120 are fixedly attached to each other with welds 117 located on a periphery. In the embodiment shown in FIG. 2b, base 102 of upper crown 110 may include a protrusion 118 extending from bottom surface 114. Base 108 of lower crown 120 may include a cavity with a diameter approximately equal to or slightly larger than that of protrusion 118. Cavity 128 may extend completely through lower crown 120. Protrusion 118 of upper crown 110 may extend into cavity 128, exposing a bottom surface 119 of protrusion 118 to cooling medium. Welds 117 may be formed on the exposed perimeter of protrusion 118, and on the exposed perimeter of the mating surfaces of upper and lower crowns 110, 120. Upper crown 110 may also include a lip 116 that extends from its bottom surface 114 and contacts top surface 122 of lower crown 120. Alternatively or additionally, lip 116 may be provided on top surface 122 of lower crown 120. When viewed from above, central air gap 130 may have the general shape of an annular ring around protrusion 118 and annular air gap 132 may have the shape of a generally annular ring separated from the central air gap 130 by an annular ring of lip 116.

Although one solid generally cylindrical protrusion at the center of base 102 and an annular lip 116 at the boundary of base 102 and side wall 104 are depicted in FIG. 2b, any number, size and geometry of protrusions 118 and lips 116 can be used in this embodiment. For example, multiple protrusions 118 of any shape can protrude from bottom surface of upper crown 110. These multiple protrusions may protrude into any number of mating cavities 128 formed on lower crown 120. Welds 117 may be formed on some or all of the exposed bottom surfaces of protrusions 119. Lip 116 may also be provided at any location on the mating surface.

Figure 3A:
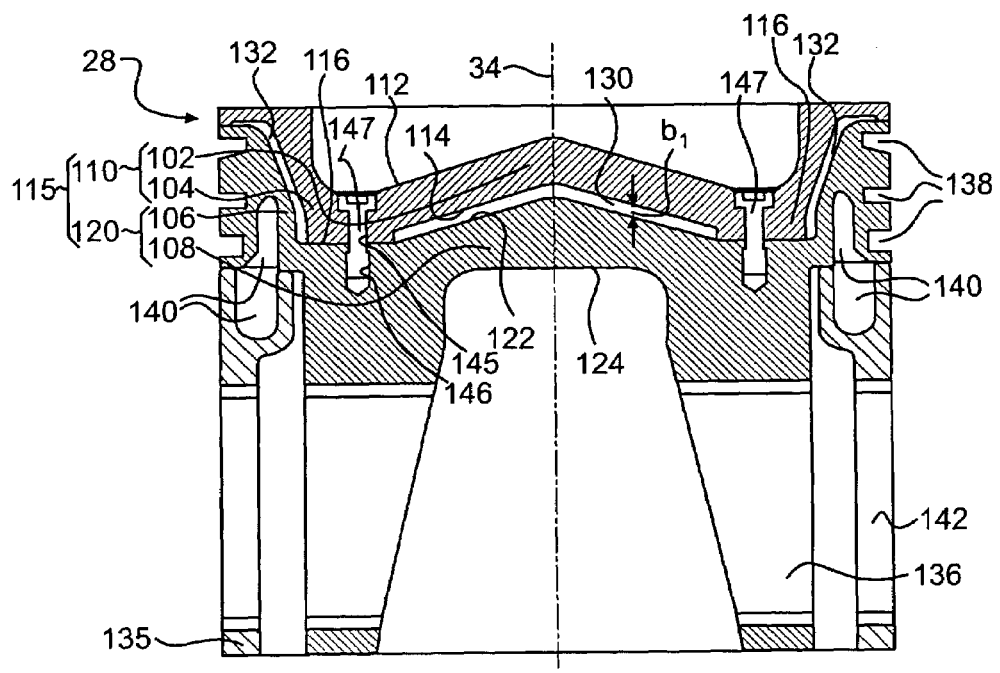
FIG. 3a is a cross-sectional illustration of an exemplary disclosed piston for use with the internal combustion engine of FIG. 1.

FIG. 3a is a cross-sectional view of another exemplary embodiment of piston 28, where upper and lower crown 110, 120 are removably attached to each other with threaded fasteners 147. The general shape of upper crown 110, lower crown 120 and air gap 130, 132 of the embodiment depicted in FIG. 3a may be similar to that depicted in FIG. 2a. In the embodiment of FIG. 3a, upper crown 110 may have an annular array of fastener holes 145 in base 102, located radially symmetric about longitudinal axis 34. Lower crown 120 may also have mating fastener holes 146 in base 108. Fasteners 147 may pass through holes 145 on upper crown 110 to attach to fastener holes 146 on lower crown 120 and removably connect upper crown 110 to lower crown 120. In the embodiment depicted in FIG. 3a, fastener hole 146 and/or holes 145 may be threaded. It is contemplated that different sizes, locations, and number of fasteners than that depicted in FIG. 3a may be used to attach upper crown 110 to lower crown 120. Removably attaching upper crown 110 to lower crown 120 may facilitate replacement of damages upper crown 110.

Figure 3B:
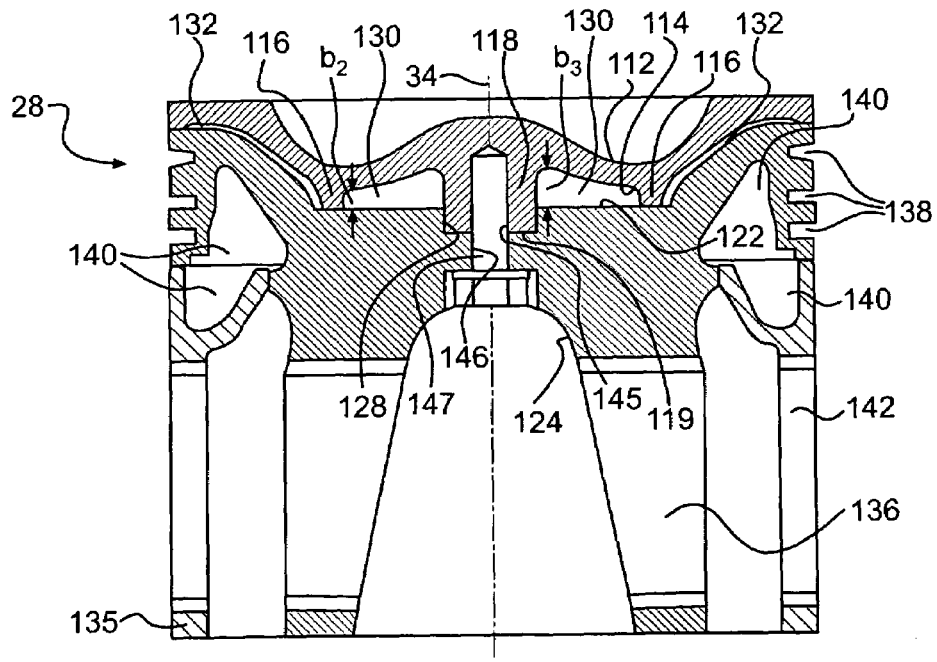
FIG. 3b is a cross-sectional illustration of another exemplary disclosed piston for use with the internal combustion engine of FIG. 1.

FIG. 3b is a cross-sectional view of another exemplary embodiment of piston 28, where upper and lower crown 110, 120 are removably attached to each other with a single centrally located fastener 147. In this embodiment, cavity 128 of lower crown 120 may have a fastener hole 146, and protrusion 118 may have a mating fastener hole 145 on bottom surface 119 of protrusion 118. In this embodiment, fastener hole 146 may be non-threaded and upper crown fastener hole may be threaded. In some applications, however, fastener hole 146 may also be threaded. Protrusion 118 may fit into cavity 128 formed on lower crown 120, and a single fastener 147 may be used to removably attach upper crown 110 to lower crown 120. Fastener 147 may be fastened from cooling surface 124 side of lower crown 120. Use of a single fastener 147 facilitates easier attachment and detachment of upper crown 110 from lower crown 120.

INDUSTRIAL APPLICABILITY

The disclosed piston may be applicable to any engine 10 where efficiency is important. The disclosed piston 28 reduces wasted thermal energy by providing one or more thermally insulating air gaps in the path of heat conduction through the piston. By reducing the heat lost by conduction, the disclosed piston 28 improves engine thermal efficiency. The operation of engine 10 with the disclosed piston 28 will now be explained.

During a intake stroke of engine 10, as piston assembly 14 moves within cylinder 26 between the TDC position and the BDC position, intake valve 70 may be in the open position, as shown in FIG. 1. During the intake stroke, the downward movement of piston assembly 14 toward the BDC position may create a low pressure within cylinder 26. The low pressure may act to draw air from intake passageway 62 into cylinder 26 via intake port 64.

Following the intake stroke, both intake valve 70 and exhaust valve 72 may be in a closed position where the air is blocked from exiting cylinder 26 during the upward compression stroke of piston assembly 14. As piston assembly 14 moves upward from the BDC position toward the TDC position during the compression stroke, the pressure and temperature of the air within the cylinder 26 may increase due to friction between air molecules. When piston 28 is at or near the TDC position, fuel may be injected into cylinder 26 by fuel injector 78. It is contemplated that fuel may be injected into cylinder 26 at any time during the compression stroke, during a portion of the intake stroke, or at multiple times during both the suction and compression strokes.

When the injected fuel mixes with the high temperature air inside the cylinder 26, it may vaporize and undergo a series of chemical reactions resulting in combustion. The heat produced by the combustion of the fuel may further increase the pressure and temperature of the gases within in the cylinder 26. This high pressure of gases within the cylinder may act on combustion surface 112 of piston 28 pushing it towards the BDC position. High temperature gases within cylinder 26 may act on piston 28 by expansion within the cylinder 26. This movement of piston 28 from TDC to BDC is known as the power stroke. The exhaust valve 72 may open when the piston 28 is again near the BDC. When the piston 28 once more moves towards the TDC in the exhaust stroke, most of the exhaust gases may be forced out of the cylinder 26. In some applications, the exhaust gases may be passed through a turbocharger or a turbine of the engine to extract power from these gases. The hotter the exhaust gases, more power can be extracted in the turbocharger.

During combustion of the fuel, the temperature of the combustion surface 112 of piston 28, which is in contact with the hot gases of combustion chamber 60, may increase. This heat may be conducted towards the cooler regions of piston 28. For example, the heat may be conducted from combustion surface 112 to relatively cooler cooling surface 124 of piston 28. This removal of heat from combustion chamber 60 may reduce the amount of heat available for transformation to useful work during the power stroke.

Because of its low thermal conductivity, stagnant air may be a good thermal insulator. Air gaps 130, 132 reduce the amount of heat lost by conduction through the piston 28. When the thickness of the air gaps 130, 132 increase, convective heat transfer occurs within the stagnant air in the gap and the heat insulating properties of air gaps 130, 132 decrease. To maximize the insulating properties, the thickness of the air gaps 130, 132 should be chosen to minimize the heat transfer due to convection and conduction. Increasing air gap thickness decreases the weight of the piston 28, which increases the acceleration of piston 28 from TDB to BDC during the power stroke, thereby improving engine efficiency. Therefore, choosing a specific air gap thickness may involve a tradeoff between the amount of heat insulation desired and the piston weight. The optimal thickness of the air gap may depend upon the specific characteristics of the engine 10, and in some applications, may optimally be between 0.5 mm and 2 mm. The thickness of the air gap in general, however, may vary from 0.5 mm to 30 mm. It is contemplated that in some applications some or all the air gaps 130, 132 may be filled with an insulating medium, such as argon or a ceramic. It is also contemplated that the air gaps 130, 132 may be maintained as a vacuum.

To decrease the conduction of heat from upper crown 110 to lower crown 120, the area of air gaps 130, 132 may exceed 60% of the mating surface area. In some applications, it is contemplated that the area of air gaps 130, 132 could exceed 80% of the mating surface area. The thicknesses and/or widths of the air gaps at different regions may be different. For example, because the rate of cooling at cooling passages 140 may be different from the rate of cooling at cooling surface 124, the motive force for heat conduction along a path from combustion surface 112 to cooling passage 140 may be different than along a path from combustion surface 112 to cooling surface 124. To ensure that these multiple paths are insulated adequately, multiple air gaps are provided along the mating surface. In applications where a relatively uniform temperature of lower crown 120 is desired, the thickness of air gap 132 under side wall 104 of the upper crown 110 may be different than the thickness of air gap 130 under base 102 of upper crown 110.

Upper crown 110 may be rigidly attached to lower crown 120 to prevent relative motion between them and to avoid undesirable vibration during the motion of piston 28. Upper crown 110 may be rigidly attached to lower crown 120 in a fixed or removable manner. For example, a welding process may be used to fixedly attach upper crown 110 to lower crown 120 in a high volume manufacturing environment when assembly time is important. This welding processes may include among others, a friction welding process, an induction welding process, or a laser welding process. These welding processes may also eliminate the need for additional parts, such as clips or fasteners, that have to be stocked and managed on the shop floor.

Friction welding uses the heat of friction to melt a portion of upper crown 110 and/or lower crown 120 while forcing them together. Sufficient frictional heat may be generated at the contacting faces of upper and lower crowns 110, 120 by rotating one crown member against the other. Induction welding may use electromagnetic induction to heat the contacting surfaces of upper and lower crowns 110, 120. The induction welding apparatus may generate a high-frequency electromagnetic field that creates eddy currents and resistively heats the contacting surfaces of the electrically conductive crown members. The embodiment shown in FIG. 2a may be fabricated through the frictional welding or the induction welding techniques. In laser welding, concentrated energy from a laser may be used to melt a narrow zone of the material at exposed mating surfaces of upper and lower crown 110, 120. Because the heat affected zone in this process is narrow, the stresses built up in weld 117 due to expansion mismatch of upper crown 110 and lower crown 120 may be minimized. The embodiment shown in FIG. 2b may be fabricated using laser welding.

Upper crown 110 may also be attached to lower crown 120 in a removable manner using fasteners 147. Similar to the use of welds 117 to attach upper and lower crown 110, 120, the use of fasteners 147 also prevents relative motion between crown members 110, 120, reducing the likelihood of separation of upper crown 110 from lower crown 120 during operation of engine 10. While the use of fasteners 147 may involve additional piece parts, it may eliminate potential stress build up due to differential thermal expansion of the crown members. Attaching upper crown 110 to lower crown 120 in a removable manner using fasteners 147 may facilitate repair and/or remanufacturing of piston 28.

Upper crown 110 and lower crown 120 may be fabricated of the same or different materials. Because upper crown 110 will be exposed to the high temperatures of combustion chamber 60, it may be fabricated from a heat resistant material, such as Inconel®, or Ni-Resist. Lower crown 120 may be fabricated from a lower cost material such as cast iron, steel or an aluminum alloy. In some applications, the upper and lower crown material may be chosen to decrease the thermo-mechanical stresses in the assembly. For example, in some applications, the materials may be chosen such that their coefficients of thermal expansion are substantially similar, and the thermo-mechanical stresses induced after assembly are minimized. In other applications, the materials may be chosen such that the thermal elongation of the attached regions of upper and lower crowns 110, 120 at their average operating temperature are substantially equal and the stresses induced in welds 117 during operation are minimized.

High temperatures may decrease the lifetime of piston 28 and associated piston rings. To cool the piston rings, a cooling medium may be circulated through cooling passageway 140. To cool the bulk of the piston body, cooling surface 124 may be actively cooled. For example, engine oil may be splashed on cooling surface 124 during the rotation of crankshaft 32. Cooling passage way 140 and cooling surface 124 together enable cooling of piston 28. Keeping the lower crown 120 at a cooler temperature improves its durability. Keeping the piston rings cool may prevent the accumulation of carbon on them due to high temperature. Dividing piston 28 into upper and lower crowns 110, 120 that are substantially insulated from each other by air gaps 130, 132 may allow lower crown 120 to be maintained at a low temperature while upper crown 110 is maintained at a high temperature for increased engine efficiency.

In the current disclosure, a substantial portion of upper crown 110 is insulated from the cooled lower crown 110 by insulating air gaps 130, 132. Therefore, the thermally insulating air gaps 130, 132 may minimize heat extraction from combustion chamber 60. Because lower crown 120 is actively cooled by circulating a cooling medium through cooling passage 140 and by cooling surface 124, the disclosed piston 28 may be adequately cooled. Also, since upper crown 110 is rigidly attached to lower crown 120 using welds 117 and/or fasteners 147, the danger of upper crown 110 separating from lower crown 120 during reciprocating motion of piston 28 may be minimized.

It will be apparent to those skilled in the art that various modifications and variations can be made to the disclosed engine piston 28. Other embodiments will be apparent to those skilled in the art from consideration of the specification and practice of the disclosed engine piston 28. For example, although the embodiments described attach upper crown 110 to lower crown 120 using only welds 117 or only fasteners 147, it is contemplated that upper crown 110 could be attached to lower crown 120 using a combination of welds 117 and fasteners 147. It is intended that the specification and examples be considered as exemplary only, with a true scope being indicated by the following claims and their equivalents.

What is claimed is:

1. A piston for an internal combustion engine, comprising;
   an upper crown having a top surface, a bottom surface opposite the top surface, and a side wall, the top surface being exposed to a combustion chamber of the engine;
   a lower crown having a side wall containing one or more annular ring grooves, an upper surface, and a lower surface opposite the upper surface, the upper crown is rigidly attached to the lower crown such that at least a part of the bottom surface of the upper crown contacts the upper surface of the lower crown; and
   a central air gap between the bottom surface and the upper surface, and a separate annular air gap positioned radially outwards of the central air gap and radially between the side wall containing ring grooves and the upper crown side wall, both the central air gap and the annular air gap having a predetermined pattern, and being sealed to prevent airflow into or out of the air gaps.

2. The piston of claim 1, wherein an air gap area corresponding to a sum of an area of the central air gap and an area of the annual air gap, the area being measured in a direction substantially parallel to a bottom surface of the upper crown, and a contact area corresponding to an area of the upper crown that contacts the lower crown, are sized such that the air gap area exceeds the contact area.

3. The piston of claim 2, wherein a ratio of the air gap area to the contact area exceeds about 3.

4. The piston of claim 2, wherein an air gap thickness, corresponding to a distance between the bottom surface and the upper surface at an air gap location, is between about 0.5 mm and about 30 mm.

5. The piston of claim 1, wherein the upper crown is rigidly attached to the lower crown using one or more threaded fasteners.

6. The piston of claim 1, wherein the central air gap and the annular air gap are symmetric about a longitudinal axis of the piston.

7. The piston of claim 1, wherein the upper crown is rigidly attached to the lower crown by welds.

8. The piston of claim 1 further including:
   a protrusion on the bottom surface extending along a longitudinal axis of the piston; and
   a cavity on the lower crown, wherein the protrusion extends into the cavity.

9. The piston of claim 8, wherein the central air gap is annularly positioned about the longitudinal axis and formed around the protrusion, and the piston further includes an annular projection separating the central air gap and the annular air gap.

10. An internal combustion engine comprising;
an engine block forming at least one cylinder;
a crankshaft rotatably disposed within the engine block;
a piston disposed within the cylinder, the piston including:
an upper crown rigidly attached to a lower crown, and including a side wall, the lower crown including one or more annular ring grooves on a side wall, the upper crown and the lower crown forming a first air gap between the upper crown and the lower crown, and an annular second air gap positioned radially outwards of the first air gap and radially between the side wall containing ring grooves and the upper crown side wall, the annular second air gap being substantially symmetric about a longitudinal axis of the piston and positioned proximate an outer periphery of the piston, the first and second air gaps also being sealed to substantially prevent air flow into and out of the air gaps; and
a connecting rod mechanically coupling the piston to the crankshaft.

11. A piston for an internal combustion engine, comprising;
a longitudinal axis;
an upper crown having a base and a side wall; and
a lower crown having a base and a side wall having one or more annular ring grooves on an outer portion thereof;
wherein the upper crown and the lower crown are rigidly attached to each other;
a central air gap between the base of the upper crown and the base of the lower crown, the central air gap being substantially symmetric about the longitudinal axis;
an annular air gap between the side wall of the upper crown and a side wall of the lower crown, the annular air gap being substantially symmetric about the longitudinal axis;
an annular projection between the central air gap and the annular air gap; and
the air gaps are sealed to prevent airflow into and out of the air gaps.

12. The piston of claim 11, wherein a thickness of the central air gap along a direction of the longitudinal axis is between about 0.5 mm and about 30 mm.

13. The piston of claim 11, wherein an air gap area corresponding to a sum of an area of the central air gap and an area of the annual air gap, the area being measured in a direction substantially parallel to a bottom surface of the upper crown, and a contact area corresponding to an area of the upper crown that contacts the lower crown, are sized such that the air gap area exceeds the contact area.

14. The piston of claim 13, wherein a ratio of the air gap area to the contact area exceeds about 3.

15. The piston of claim 11, further including a protrusion on the base of the upper crown extending along the longitudinal axis, and a cavity on the base of the lower crown, wherein the protrusion extends into the cavity.

16. The piston of claim 15, wherein the upper crown and lower crown are welded together along a periphery of the protrusion.

17. The piston of claim 11, wherein at least one of the central air gap and annular air gap is filled with a thermally insulating medium.

18. A piston for an engine comprising;
an upper crown having a base and a sidewall, the sidewall having an outer side surface; and
a lower crown having a base and a side wall, the sidewall having an inner side surface; the lower crown being rigidly attached to the upper crown with a plurality of air gaps formed between the upper crown and the lower crown, the air gaps being substantially sealed to restrict flow of air into and out of the air gaps, the air gaps including,
a central air gap positioned about longitudinal axis of the piston, and
an annual air gap separate from the central air gap and positioned radially outwards of the central air gap, the annular air gap being formed between the outer side surface of the upper crown sidewall and the inner side surface of the lower crown sidewall.

19. The piston of claim 18 further including:
a protrusion of the upper crown extending along the longitudinal axis; and
a cavity on the lower crown, wherein:
the protrusion extends into the cavity, and
the upper crown and lower crown are welded together along a periphery of the protrusion.

20. The piston of claim 18, wherein a combined area of the central air gap and the annual gap along a direction parallel the base and inner side surface of the lower crown exceeds an area of the upper crown that contacts the lower crown.

* * * * *